R. H. BRADSHAW.
RIMLESS SPECTACLES AND EYEGLASSES.
APPLICATION FILED NOV. 25, 1919.
1,337,818. Patented Apr. 20, 1920.
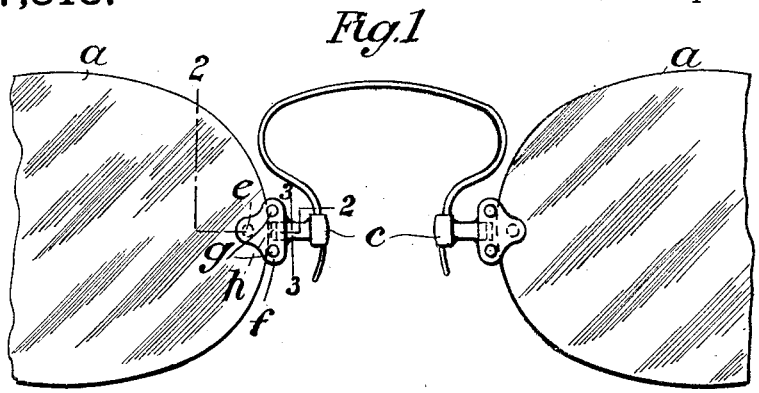
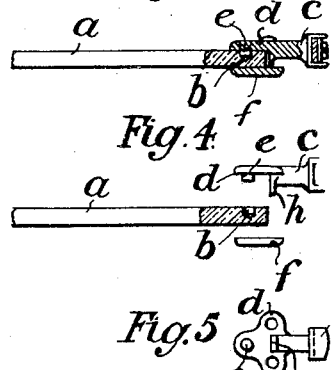
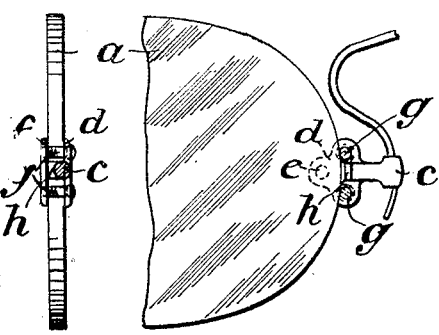
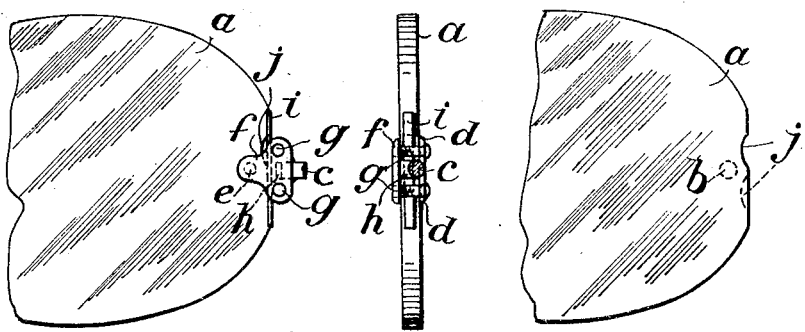
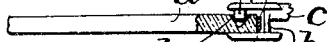
Witnesses
J. K. Moore
R. E. Barry
Inventor
Reginald H. Bradshaw

UNITED STATES PATENT OFFICE.

REGINALD HENRY BRADSHAW, OF LONDON, ENGLAND.

RIMLESS SPECTACLES AND EYEGLASSES.

1,337,818. Specification of Letters Patent. Patented Apr. 20, 1920.

Application filed November 25, 1919. Serial No. 340,567.

*To all whom it may concern:*

Be it known that I, REGINALD HENRY BRADSHAW, a subject of the King of Great Britain, residing at 13 Wilmington avenue, Chiswick, London, England, have invented new and useful Improvements in or Connected with Rimless Spectacles and Eyeglasses, of which the following is a specification.

My invention relates to rimless spectacles and eyeglasses of the kind wherein each lens is secured to the mount through the medium of two clamping plates one of which is rigidly attached to the said mount and the other of which is loose and is secured to the fixed plate by screws, the lens itself being formed with a recess on either or both faces with which a pin or pins upon either or both of the clamping plates engages or engage.

Now, the object of my invention is to improve this mode of attaching lenses to mounts, and, to this end, I provide for the two clamping plates of each pair being secured together by means of two screws which are so disposed that they bear against the periphery of the lens and prevent the lateral movement of the said lens in the mount, thereby obviating the necessity for the employment of shoulders or the equivalent which are usually provided on the mount for that purpose. Either the fixed plate or the loose plate or each of these plates is furnished on its inner face with a short pin which is designed to enter a recess or depression in the lens, the said depression or depressions in some cases being replaced by a hole formed completely through the lens, although this latter alternative is not to be preferred in view of the fact that it lends itself to liability of fracture of the lens, either in the course of the manufacture or during adjustment of the lens in the mount, or from the effect of a blow or undue strain during use.

In practice, in order to prevent the plates being clamped too tightly against one another with the consequent risk of fracture of the lens, one of the said plates, preferably that which is secured to the mount, is furnished with a flange at that part between the aforementioned screw holes, the said flange thus constituting a distance piece which controls the degree to which the plates may be screwed together. Washers may be introduced between the screws and the lens periphery and also in the recess or recesses in the lens.

Furthermore, the recess or recesses may be made of a conical or taper shape, the pin being left cylindrical, or the recess may be made cylindrical, in which case the pin is preferably conical on that side adjacent to the flange. The object of this provision is to insure that when the pin is inserted in the recess or depression it may engage in the bottom of the latter without touching the edge, thereby reducing the possibility of tearing or flaking of the surface of the lens if tension in the direction of the flange is imposed upon the pin.

Additional security may be provided by directly attaching the loose plate to the flange on the fixed plate, this being effected either by means of a projecting pin on the said flange which enters a hole in the loose plate or by means of a screw passing through threaded holes in the flange and loose plate.

To enable my invention to be readily understood I will describe it by reference to the accompanying drawing, in which:—

Figure 1 is a front view of part of a pair of rimless eye-glasses constructed according to the invention.

Fig. 2 is a section on the line 2—2, Fig. 1.

Fig. 3 is a section on the line 3—3, Fig. 1.

Fig. 4 shows the several parts of Fig. 2 detached from one another.

Fig. 5 is an elevation of the mount fitting shown in Fig. 4.

Fig. 6 is a view of one lens and fitting with the movable clamping plate removed.

Fig. 7 is a view similar to Fig. 1 showing one lens and illustrating a modification.

Fig. 8 is a view at right angles to Fig. 7.

Fig. 9 is a sectional plan view thereof, and

Fig. 10 is a detached view of the lens shown in Figs. 7 to 9.

$a$ indicates the lenses each of which is formed on one side with a depression or recess shown at $b$. In Figs. 1 to 6 the depression or recess is shown of cylindrical shape whereas in the modification shown in Figs. 7 to 9 the said recess is of conical or taper shape. $c$ indicates the mount or fitting to which the lens is to be attached and $d$ shows the clamping plate which is fixed to, or is integral with, the mount. $c$, $e$ being the pin which is provided upon its inner face for engagement with the depression or recess $b$ in the lens $a$. $f$ is the loose clamping plate which is designed to bear upon the opposite face of the lens $a$ to that against which the plate $d$ bears, and $g$ indicates the two screws by means of which these two plates $d$ and $f$ are secured together so as to grip the said lens between them. As above described, and as shown, these two screws $g$ are so placed relatively to the pin $e$ that they bear against the periphery of the lens, thus forming shoulders against which the latter bears and is thereby prevented from lateral movement. This construction, therefore, obviates the necessity for the provision of special means for preventing such lateral movement of the lens as is customary with the methods of connection as heretofore used.

$h$ is the flange or distance piece which is fixed to, or is integral with, the mount $c$ and projects from the inner face of the fixed plate $d$ at that part between the screws $g$ and in the plane thereof, and the object of which is to prevent the fracture of the lens by its being too tightly clamped by the said screws.

As, in practice, it is found difficult to grind or cut the lens sufficiently accurately to insure that no pressure shall be set up between it and the three points where the screws and pin make contact with the lens, washers or elastic packing may be introduced either in the recess or recesses in the lens or between the clamping screws and the periphery of the lens, or in both these positions as above described. These washers may be made of any suitable material, such as cloth or rubber, in the case of the lens recess, or of steel or other suitable metal when used between the clamping screws and the lens periphery. In the latter case two washers may be used, one in connection with each screw, or one continuous washer, such as indicated at $i$ Figs. 7, 8 and 9, extending between the inner surface of the flange $h$ and the screws $g$ and the lens periphery which latter is preferably flattened as indicated. Furthermore, the periphery of the lens may be slightly indented in any convenient manner, as indicated at $j$ Figs. 7 to 10, opposite either or both of the screws, so as to provide means for relieving the tension between the points of contact of the screws and pin and lens when the clamping screws $g$ are tightened up.

In cases where a hole is drilled completely through the lens in lieu of the recess or recesses $b$ the pin or pins $e$ may be replaced by a screw adapted to be passed through the said hole and to engage screw-threaded holes in the clamp plates.

Claims.

1. In a pair of eye-glasses or spectacles, the combination with a lens, of a clamping plate fitting against one side of said lens, a second clamping plate fitting on the other side of the lens, said lens being provided with a cut-away portion and one of said plates having a projection which enters the cut-away portion, and a clamping screw passing through both of said plates and situated at one side of said projection and co-acting with the edge of the lens to prevent rotation of the same about said projection.

2. In a pair of eye-glasses or spectacles, the combination with a pair of clamping plates engaging the opposite sides of a lens, of a clamping screw securing the plates together and co-acting with the edge of the lens to prevent rotation of the lens within the clamping plates.

3. In a combination as defined in claim 2, a packing strip arranged between the screw and the edge of the lens.

4. In a combination as defined in claim 2, the edge of the lens being recessed and a packing strip arranged over the recess and located between the screw and the edge of the lens.

5. In a combination as defined in claim 2, one of the clamping plates being provided with a distance piece which engages the other clamping plate and prevents the screw from drawing the plates too near each other.

6. In a pair of eye-glasses or spectacles, the combination with a lens having a recess extending parallel to its axis and located near one edge of the lens, of a plurality of clamping plates engaging the opposite sides of the lens, a projection provided upon one of the plates and extending into the recess, and clamping screws securing the plates together and co-acting with the edge of the lens to prevent rotation of the lens about the projection.

REGINALD HENRY BRADSHAW.